US011823659B2

(12) United States Patent
Reinspach et al.

(10) Patent No.: US 11,823,659 B2
(45) Date of Patent: Nov. 21, 2023

(54) SPEECH RECOGNITION THROUGH DISAMBIGUATION FEEDBACK

(71) Applicant: Amazon Technologies, Inc., Reno, NV (US)

(72) Inventors: Julia Reinspach, Seattle, WA (US); Oleg Rokhlenko, Kirkland, WA (US); Ramakanthachary Gottumukkala, Sammamish, WA (US); Giovanni Clemente, Seattle, WA (US); Ankit Agrawal, Bellevue, WA (US); Swayam Bhardwaj, Seattle, WA (US); Guy Michaeli, Seattle, WA (US); Vaidyanathan Puthucode Krishnamoorthy, Seattle, WA (US); Costantino Vlachos, Seattle, WA (US); Nalledath P. Vinodkrishnan, Bellevue, WA (US); Shaun M. Vickers, Seattle, WA (US); Sethuraman Ramachandran, Issaquah, WA (US); Charles C. Moore, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

(21) Appl. No.: 16/711,046

(22) Filed: Dec. 11, 2019

(65) Prior Publication Data

US 2021/0183366 A1 Jun. 17, 2021

(51) Int. Cl.
*G10L 15/06* (2013.01)
*G10L 15/01* (2013.01)
(Continued)

(52) U.S. Cl.
CPC ............ *G10L 15/063* (2013.01); *G10L 15/01* (2013.01); *G10L 15/02* (2013.01); *G10L 15/187* (2013.01);
(Continued)

(58) Field of Classification Search
CPC ....... G10L 15/063; G10L 15/01; G10L 15/02; G10L 15/187; G10L 15/22;
(Continued)

(56) References Cited

U.S. PATENT DOCUMENTS 7,567,903 B1 * 7/2009 Goffin ................... G10L 15/12
704/250
2004/0172258 A1 9/2004 Dominach et al.
(Continued)

OTHER PUBLICATIONS

International Search Report and Written Opinion issued in PCT Application No. PCT/US2020/063811, dated Mar. 23, 2021.
(Continued)

*Primary Examiner* — Michael Colucci
(74) *Attorney, Agent, or Firm* — Hogan Lovells US LLP

(57) ABSTRACT

A request including audio data is received from a voice-enabled device. A string of phonemes present in the utterance is determined through speech recognition. At a later time, a subsequent user input corresponding to the request may be received, in which the user input is associated with one or more text keywords. The subsequent user input may be obtained in response to an active request. Alternatively, feedback may not be actively elicited, but rather collected passively. However it is obtained, the one or more keywords associated with the subsequent user input may be associated with the string of phonemes to indicate that the user is saying or mean those words when they product that string of phonemes. A user-specific speech recognition key for the user account is then updated to associate the string of
(Continued)

phonemes with these words. A general speech recognition model can also be trained using the association.

20 Claims, 8 Drawing Sheets

(51) Int. Cl.
G10L 15/02 (2006.01)
G10L 15/187 (2013.01)
G10L 15/22 (2006.01)

(52) U.S. Cl.
CPC ........ *G10L 15/22* (2013.01); *G10L 2015/025* (2013.01); *G10L 2015/0635* (2013.01); *G10L 2015/223* (2013.01)

(58) Field of Classification Search
CPC ....... G10L 2015/025; G10L 2015/0635; G10L 2015/223; G10L 15/06; G10L 15/07; G10L 2015/225; G10L 15/30
See application file for complete search history.

(56) References Cited

U.S. PATENT DOCUMENTS

| | | | |
|---|---|---|---|
| 2005/0055210 A1* | 3/2005 | Venkataraman | G10L 15/183 704/E15.009 |
| 2008/0243777 A1 | 10/2008 | Stewart et al. | |
| 2011/0054900 A1* | 3/2011 | Phillips | G10L 15/30 704/235 |
| 2011/0055309 A1* | 3/2011 | Gibor | H04L 51/58 709/227 |
| 2011/0131036 A1 | 6/2011 | DiCristo et al. | |
| 2012/0016678 A1 | 1/2012 | Gruber et al. | |
| 2019/0206389 A1* | 7/2019 | Kwon | G10L 15/075 |
| 2019/0295542 A1 | 9/2019 | Huang et al. | |
| 2019/0324780 A1* | 10/2019 | Zhu | H04W 12/08 |
| 2019/0391828 A1 | 12/2019 | Tokuhashi et al. | |
| 2020/0034764 A1* | 1/2020 | Panuganty | G06F 40/284 |
| 2020/0342522 A1* | 10/2020 | Agarwal | G06F 8/38 |
| 2021/0151053 A1 | 5/2021 | Takahashi et al. | |

OTHER PUBLICATIONS

Restriction Requirement issued in U.S. Appl. No. 16/711,043 dated Aug. 31, 2021.
Non-Final Office Action issued in U.S. Appl. No. 16/711,043 dated Nov. 3, 2021.
Final Office Action issued in U.S. Appl. No. 16/711,043 dated May 19, 2022.
Notice of Allowance issued in U.S. Appl. No. 16/711,043 dated Feb. 17, 2023.

* cited by examiner

SPEECH RECOGNITION THROUGH DISAMBIGUATION FEEDBACK

BACKGROUND

Smart devices and digital assistants are able to help users with many tasks. In particular, voice-based control has become a popular and convenient way of interacting with such devices. This allows users to interact with the devices without having to hold or touch them or having to navigate through a graphic interface. It is even possible for users to online shop through voice interactions. For example, a user could provide a voice command such as "add diet cola to cart", and such an item would be added to their online shopping cart associated with the device. However, for a variety of reasons, the user's speech may not be correctly understood.

BRIEF DESCRIPTION OF THE DRAWINGS

Various embodiments in accordance with the present disclosure will be described with reference to the drawings, in which.

DETAILED DESCRIPTION

Figure 1A:
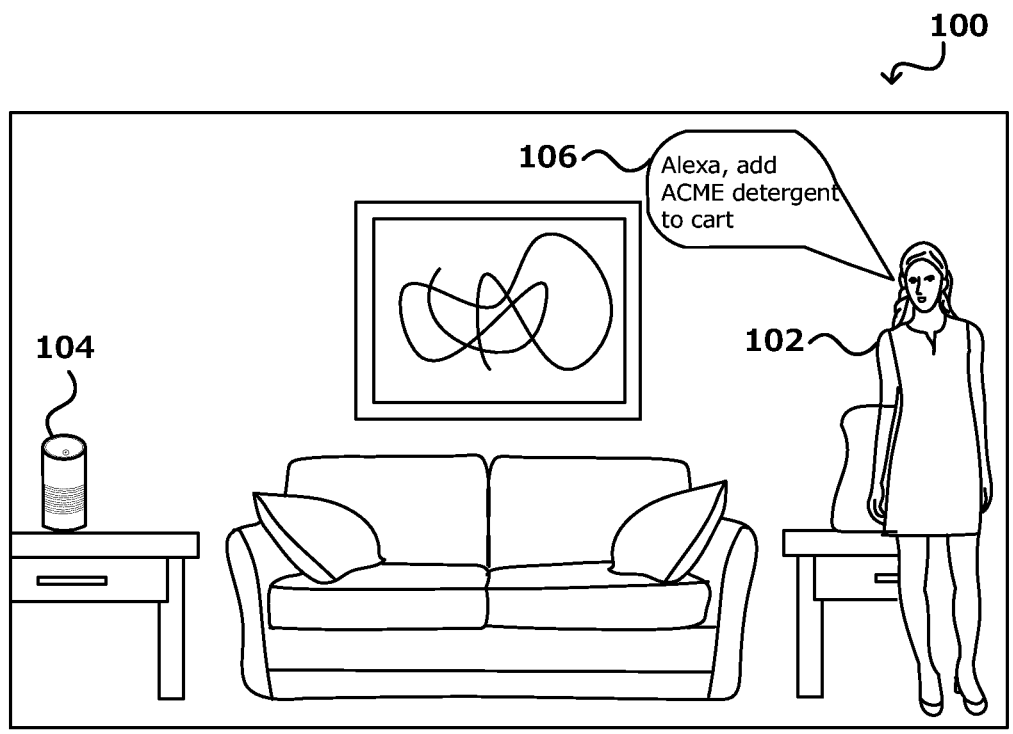
FIGS. 1A-1B illustrate an example scenario in which an automatic speech recognition system has incorrectly interpreted a voice command, in accordance with example embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Systems and methods in accordance with various embodiments of the present disclosure may overcome one or more of the aforementioned and other deficiencies experienced in conventional approaches for voice control technology. In particular, various embodiments are directed to collecting feedback to train models to better understand utterances and translate diverse user pronunciations into the intended words.

In various embodiments, a user may utter a voice directive that is detected and picked up by a voice-enabled electronic device as an "utterance". The utterance is then processed either on the device or transmitted to a remote server for processing. Specifically, the utterance undergoes an automatic speech recognition (ASR) process, wherein the utterance text is determined. In some embodiment, it may be determined that the utterance is related to a certain type of request. This may be done by detecting for certain keywords, sentence structure, vocal tone, among other information provided in the utterance. For example, it may be determined that the utterance is related to shopping. Alternatively, the utterance may be determined to be an information request, a device control input, among others. In some embodiments, the utterance may then be processed in the context of that type of request. This may include employing a natural language understanding (NLU) and/or name entity recognition (NER) framework specific to that type of request. In doing so, an ASR error may be detected if one exists. ASR error detection may be based on the confidence that the utterance was correctly understood. An ASR error may be detected if the confidence falls below a predetermined threshold. An ARS error may also be detected if there are multiple interpretations that meet the threshold. For example, the system may not be able to determine whether the user said "coke" or "coat". A feedback prompt may be triggered upon detecting an ASR error, in which the user is asked to provide additional information to clarify what they meant. The feedback prompt may take one of various forms. For example, the feedback prompt may be audio-based, in which the user is asked via audio to provide additional voice input to supplement the initial voice command. For example, the user could be asked to repeat their original command. In another example, the user may be asked to select between two possible interpretations. For example, the user may be asked "did you mean 'coke' or 'coat'?" The user may then respond to this prompt by voice, thereby providing feedback. In another embodiment, the feedback prompt may be presented in visual form, such as in the form of a message or in-app notification rather than through audio/voice. Either way, the collected additional user input can be used to better understand the intent of the user's original voice command.

The additional user input may be associated with one or more known words. For example, the user input may be a selection between two products. The name of the selected product is known and includes the one or more keywords. Thus, the one or more keywords are associated with the original utterance that could not be properly understood or caused ambiguity. The association between the utterance and the one or more keywords is then logged and used to update a user-specific speech recognition key. The user-specific speech recognition key is specific to a particular user account, as it contains information on how to interpret the way that user speaks and may not apply for other users. In some embodiments, the association between the utterance and the one or more keywords is also used to train a general speech recognition model which is used to interpret utterances for a plurality of users. The user-specific speech recognition key may be updated upon receiving the additional user input such that the next time the user makes the same utterance, the user-specific speech recognition key is referenced, and the utterance is interpreted as the one or more keywords associated with the utterance. The general speech recognition model may be a statistical model that is updated or trained in intervals and includes many entries from different users.

FIG. 1A illustrates an example environment 100 wherein a user 102 is interacting with a voice-enabled client device 104. A voice-enable client device 104 includes, for example, any device having a microphone or other component configured to generate audio data from sound in the frequency range in which humans communicate. Although a voice communications device (e.g., an Amazon Echo) is illustrated, it should be understood that the device 104 may be various other types of electronic devices that are capable of outputting audio and which have audio playback controls. These devices can include, for example, speakers, receivers, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others. In the example scenario 100 of FIG. 1A, the voice-enable client device 104 may also serve as an audio output device such as for playing music. The voice-enable client device 104 can communicate with a server over at least one network, such as the Internet, a cellular network, a local area network (LAN), an Ethernet, Wi-Fi, or a dedicated network, among other such options.

As will be described further herein, the voice-enable client device 104 may utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, user 102 can speak a request within an environment where the voice-enabled communications device 104 is located. The request may be any question, inquiry, instruction, phrase, or other set of one or more words/sounds. For example, the user may say, "Alexa, turn on kitchen lights" In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice-enabled communications device. Persons of ordinary skill in the art will recognize, however, that the one or more microphones may alternatively be located on a separate device in communication with the voice-enabled communications device. In some embodiments, after the wakeword is detected, the voice-enabled communications device may begin interpreting/analyzing audio input data until no more speech is detected.

In general, the voice-enabled communications device 104 constantly listens for the wakeword and is otherwise inactive. Once the wakeword is recognized, the voice-enabled communications device switches from a passive mode to an active mode. It should be noted that the wakeword does not have to be the first word or sound in a given sentence or request. The voice-enabled communications device can be configured such that it can record and store a limited amount of audio input data that should, in most instances, is the amount of time needed to speak a sentence or more. Accordingly, even if a wakeword is recognized in the middle or end of a sentence, the voice-enabled communications device will have retained the entire sentence which can then be analyzed by backend servers to determine what is being requested.

An application executing on the voice-enabled communications device or otherwise in communication with the voice-enabled communications device, can analyze the user's speech that includes audio input data to perform at least one function. The functions can include, for example, answering questions, playing music, reading audiobooks, controlling connected devices via voice commands/instructions, sending an electronic message, initiating a phone call, performing an online shopping action, among other such functions.

Figure 1B:
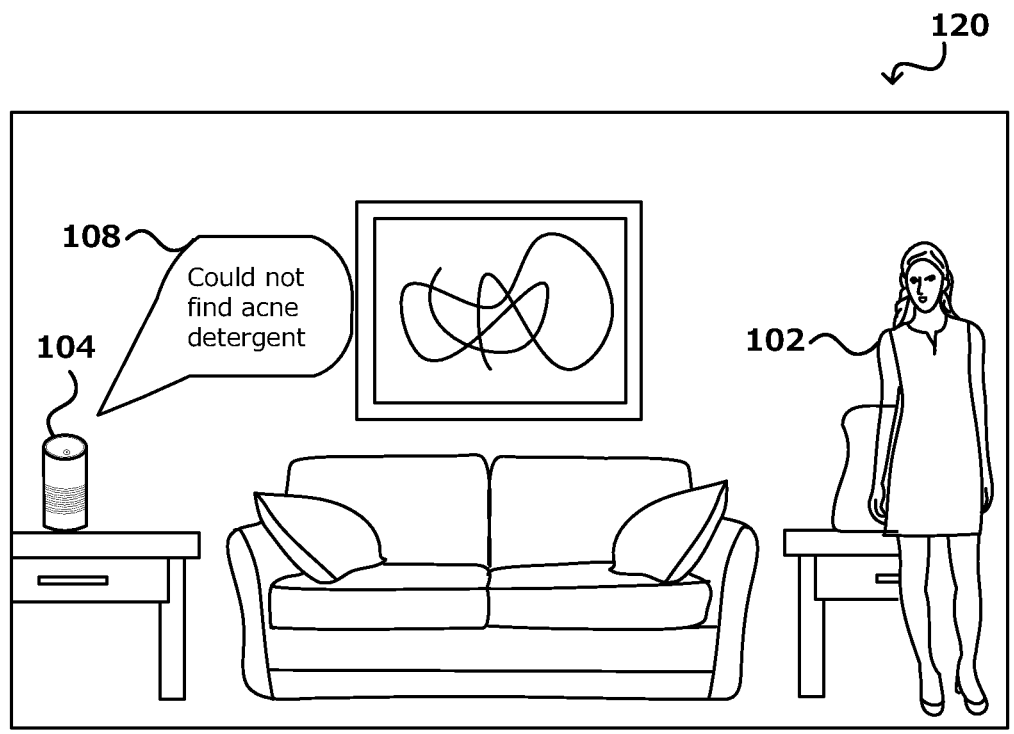

In this example, the user 102 is utilizing an online shopping function of the voice-enabled communication device 104. The voice-enable client device 104 may be logged into an account on an e-commerce platform through which a user can purchase or otherwise select items from an electronic catalog of items. The account may already be associated with information such as a payment method (e.g., credit card number), shipping address, billing address, and any other information needed to complete a transaction. Conventionally, the user would user a client device with a display such as a personal computer or smart phone to log onto a website to access the e-commerce platform. The user can then browse through the offerings or search using a keyword query to located products of interest. The user can perform various actions such as finding out information about a product, adding a product to cart, removing a product from cart, checking out, and the like. Typically information is output to the user visually through the graphic interface that is displayed on the display of the device and user inputs are entered manually via a peripheral device such as a mouse or keyboard. With voice control technology, a user can do these or similar actions through voice and audio communications, without the need for a device with a display or manually entered inputs. For example, and as illustrated, the user 102 may say "Alexa, add ACME brand detergent to cart", as illustrated in quote bubble 106. Ideally, upon receiving this voice command, the command would be correctly interpreted and the correct product would be added to an electronic shopping cart associated with the user account. However, as illustrated in FIG. 1B, it may be the case the user's command misunderstood. In this case, the spoke work "acme" is misunderstood through speech recognition as "acne". The e-commence application then used the term "acne detergent" to search for a product, and did not produce any qualifying search results. Thus, the voice-enable client device 104 says "could not find acne detergent", as indicated in quote bubble 108.

In some embodiments, the user account can be associated with a user profile. The user profile may include information such as demographic information and previous behaviors. The previous behaviors may include many types of information, such as product browsing history, purchase history, past utterances and associated actions and results, among other information. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In some embodiments, the contents of the audio input data are essentially streamed to a backend server (see FIG. 7 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in an audio file and to translate them into known text that can then be analyzed by NLU techniques to attempt to decipher the meaning of the request from user. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data can include determining a product "ACME brand detergent" an intended action "Add to cart". The backend server can then identify the product from the electronic catalog and add it to the electronic cart associated with the user account. In some embodiments, the device 104 may provide a confirmation such as "ACME brand detergent added to cart". In this case, the electronic catalog of products may only contain one product that is responsive to the product query "ACME brand detergent".

In an ideal scenario, the system can confidently determine what action to take based on the user's voice command. However, the user's utterance may not be properly interpreted through automatic speech recognition (ASR) and natural language understanding (NLU). Thus, the system may be unable to determine what words are being spoken chose the wrong words. E-commerce technology is provided as an example application of the present techniques. However, the techniques described herein can be used to improve various other technologies such as for example, answering questions, playing music, reading audiobooks, controlling connected devices via voice commands/instructions, sending an electronic message, initiating a phone call, among other such technologies. As used herein, the term "automatic speech recognition" or "ASR" refers to and includes various types and stages of speech recognition, natural language understanding, named entity recognition and understanding, categorical and contextual understanding, user intent understanding (e.g., how spoken language translates into actual user intent), and the like.

Figure 2A:
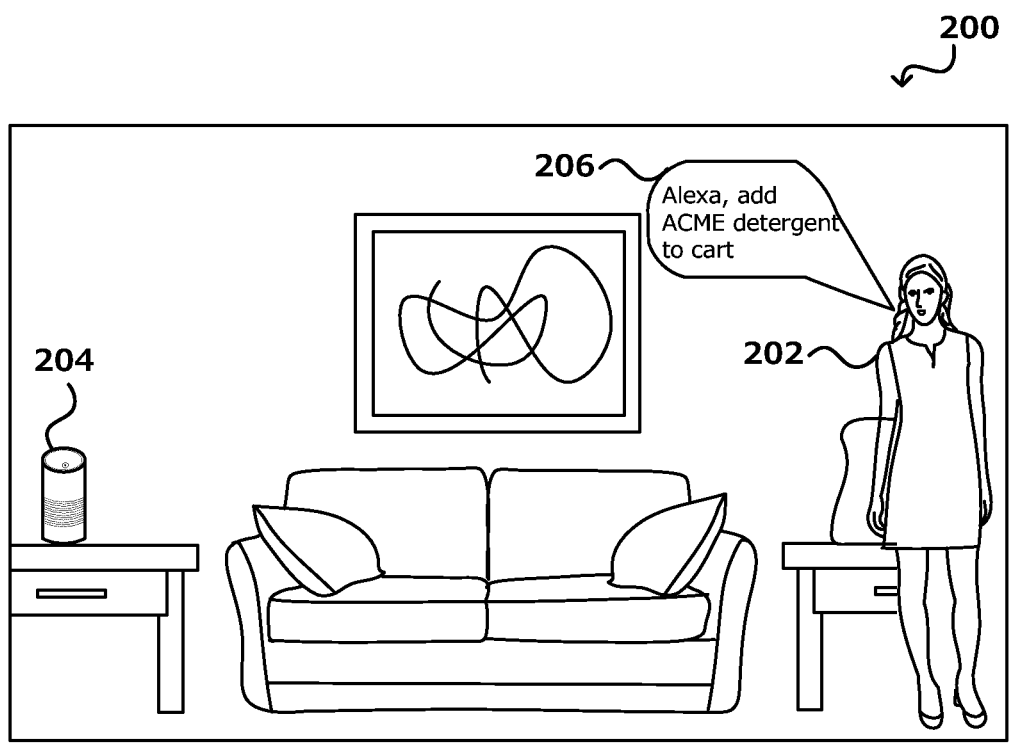
FIGS. 2A-2C illustrate an example scenario in which a user is asked to provide additional information (i.e., feedback) that helps clarify their intent as well as improves speech recognition for future instances, in accordance with example embodiments.
Figure 2B:
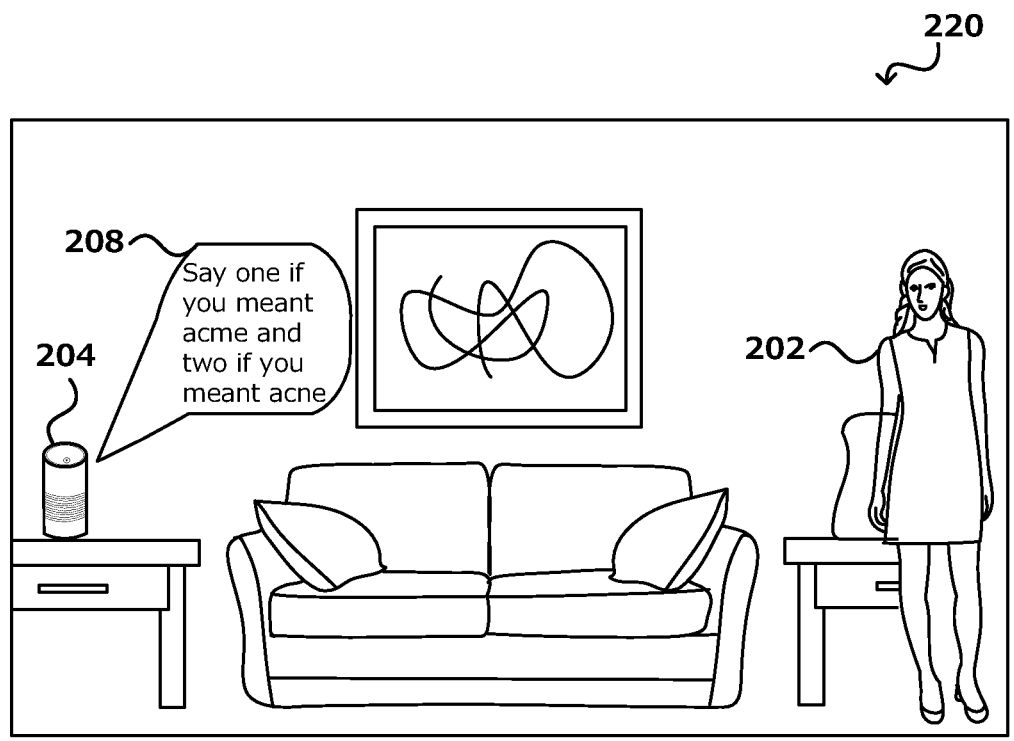
Figure 2C:
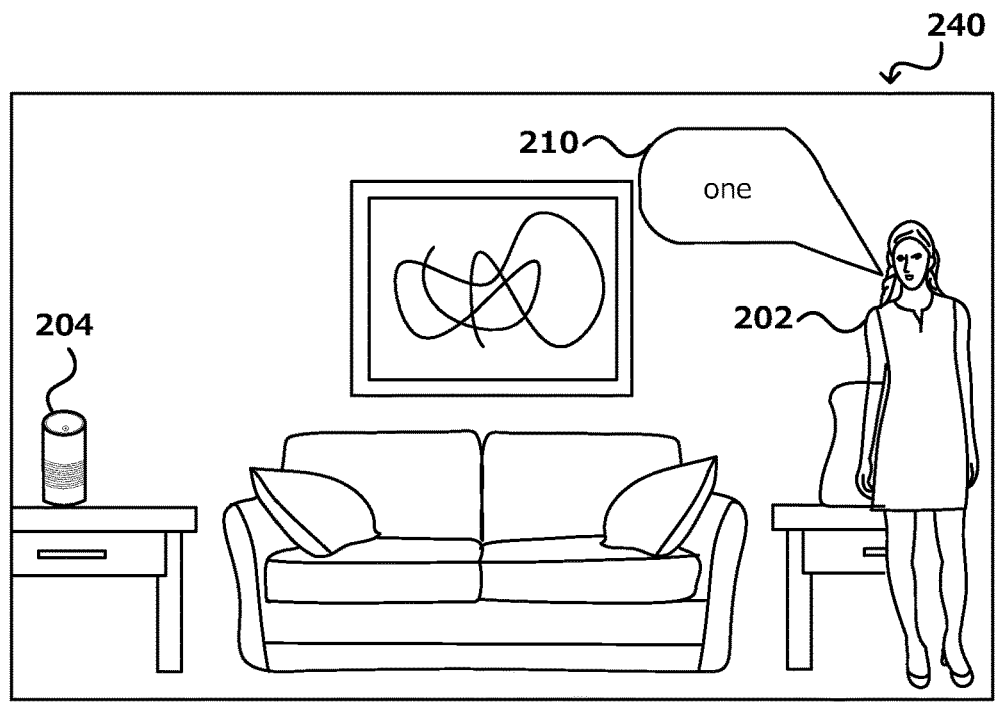

FIGS. 2A-2C illustrates such a scenario in which a user 202 is asked to provide additional information (i.e., feedback) that helps clarify their intent as well as improves speech recognition for future instances. In FIG. 2A, a user provides a voice command by saying, for example, "Alexa, add ACME brand detergent to cart", as indicated in quote bubble 206. The voice command is captured by a voice-enabled client device 204 and sent to a server for processing. In some embodiments, the processing and other techniques described herein may be performed completely or in part onboard the voice-enabled client device 204. The voice command is received as audio data which is processed through automatic speech recognition techniques. In this example, an error occurs during the speech recognition, in which the speech recognition cannot distinguish between whether the user said "acme" or "acne". As illustrated in FIG. 2B, this error causes the voice-enabled client device 204 to ask the user to select which one they meant. For example, the voice-enabled client device may say "Please say one if you meant acme or say two if you meant acne", as indicated in quote bubble 208. As illustrated in FIG. 2B, the user 202 may then respond directly to the question by saying "one", as indicated in quote bubble 210. Thus, it can be determined from this answer that the user originally said "acme" not "acne".

Figure 3:
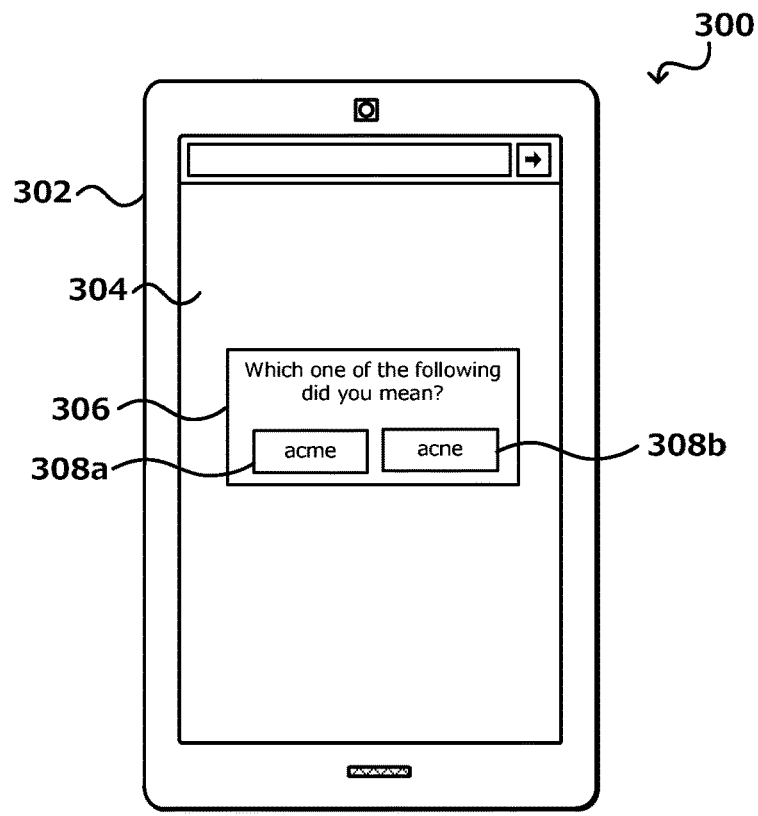
FIG. 3 illustrates an embodiment in which the additional information is elicited through a graphical interface displayed of display-based device, in accordance with example embodiments.

FIG. 3 illustrates an embodiment 300 in which the additional information is elicited through a graphical interface displayed of display-based device 302. The display-based device may be a personal computer, a smartphone, a table, or the like. Specifically, a prompt 306 may be displayed on the display 304 of the device 302. In some embodiments, the prompt 306 may appear as a pop-up as a part of the graphic interface of the e-commerce platform accessed through the device 302. The prompt 306 may be any type of graphical element that can be displayed on the display 304 of the device. In this example, as illustrated in FIG. 3, the user may be prompted through the graphic interface to select between a first button 308a representing "acme" and a second button 308b representing "acne". The feedback collected through any of the above-described means can be used to complete the initial request. This feedback can also be used to train the speech recognition to better understand that user and other users in the future, as described in detail below.

Figure 4:
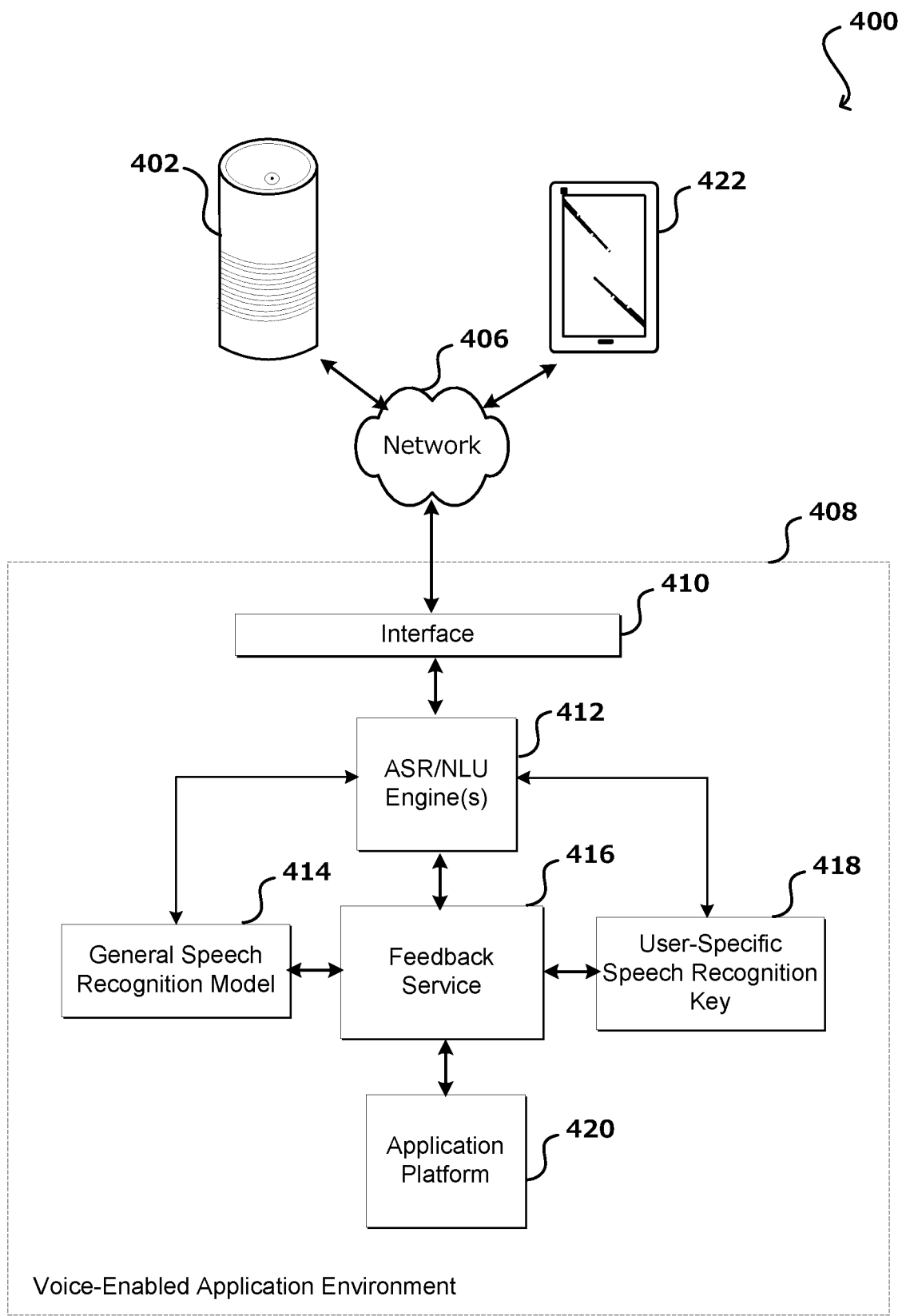
FIG. 4 illustrates a diagrammatical representation of a voice-enabled application environment with user feedback learning, in accordance with example embodiments.

FIG. 4 illustrates a diagrammatical representation 400 of a voice-enabled application environment 408 with user feedback learning, in accordance with example embodiments. A voice-enabled client device 402 captures an utterance spoken by a user, such as a command following a wakeword. The voice-enabled client device 402 then sends the audio data representative of the utterance to a server-side voice-enabled application environment 408 over a network 406. The voice-enabled client device 402 may be any type of client device that includes an audio output device such as a speaker and an audio input device such as microphone, and network connectivity. This includes special voice-communication only devices, personal computers, tablet computers, smart phones, notebook computers, and the like. The network 406 can include any appropriate network, such as the Internet, a local area network (LAN), a cellular network, an Ethernet, Wi-Fi, Bluetooth, radiofrequency, or other such wired and/or wireless network. The voice-enabled application environment 408 can include any appropriate resources for performing the various functions described herein, and may include various servers, data stores, and other such components known or used for providing content from across a network (or from the cloud). The voice-enabled client device 402 may be logged into a user account provided by an application platform 420 such as an online store.

The audio data from the voice-enabled client device 408 is received through an interface 410, which facilitates communications between the voice-enabled client device 402 and the voice-enabled application environment 408. For example, the interface 410 may process data received over the network 406 for use by other components of the server-side voice-enabled application environment 408. For example, in some embodiments, the interface 410 may perform some signal processing on the received audio data such as noise reduction, filtering, and the like. The interface 410 may also prepare data to be transmitted over the network 406 to the voice-enabled client device 402. In this example, the audio data, or a processed version of the audio data is further analyzed by an automatic speech recognition (ASR) and/or natural language understanding (NLU) engine 412, which applies a variety of techniques to convert the audio input data into a series of identifiable words, and then to analyze those words in order to interpret the meaning of the request from the user. The backend server can utilize ASR techniques to recognize the spoken words that were recorded and stored in the audio data and to translate them into known text that can then be analyzed by NLU techniques to attempt to decipher the meaning of the request from user.

In some embodiments, automatic speech recognition may be performed on the audio data to determine a string of phonemes present in the utterance. The automatic speech recognition also attempts to translate the string of phonemes into one or more words. The automatic speech recognition may be associated with a list of possible words. This may include common words of a particular language as well as names and made-up words. In some embodiments, the list of possible words is specific to a certain application. For example, for an e-commerce application, the list of words may include various name brands and e-commerce specific terms. The ASR/NLU engine(s) 412 may access a user-specific speech recognition key 418 associated with the user account and/or a general speech recognition model 414 to perform speech recognition on the string of phonemes. The user-specific speech recognition key 418 is a rules-based or deterministic means of speech recognition. The general speech recognition model 414 can also be trained using an association of the string of phonemes and the one or more keywords. The general speech recognition model is a statistical model that predicts the most likely words for a given phoneme string based on training data that includes many examples of how different users pronounce different words. In some embodiments, the user-specific speech recognition key 418 is referenced for the specific user account, and the general speech recognition model 414 is referenced during speech recognition for a plurality of user accounts. In various embodiments, the ASR/NLU engine(s) may perform various types and stages of speech recognition, natural language understanding, named entity recognition and understanding, categorical and contextual understanding, user intent understanding (e.g., how spoken language translates into actual user intent), and the like.

A user feedback service 416 may actively or passing collect feedback from users to better understand what users are saying and thereby improve the ASR/NLU engine 412. For example, actively collecting feedback may occur when an error is detected during the automatic speech recognition. For example, errors may include being unable to determine any words that correspond to the string of phonemes or being unable to distinguish between multiple words that seem to correspond to the string of phonemes. If there is an error detected in the automatic speech recognition process, additional information may be requested from the user. This may be done via the voice-enabled client device from which the initial request was received, or via a display-based client device. For example, the voice-enabled device may say "Please say one if you meant coke or say two if you meant coat". The user may then respond directly to the question with their answer through voice, just like a real-time dialogue. In some embodiments, the user may provide their answer directly without a wakeword. Alternatively, a prompt may be generated in the graphic interface of the e-commerce platform displayed on a client device such as a computer or smartphone. For example, the user may be prompted through the graphic interface to select between the options "coat" or "coke".

An example of passively collecting feedback is when there is no error detected in the automatic speech recognition process, and the system thinks it has successfully determined the words and intention of the user. Depending on the application, an action may be performed based on that determination. For example, in an e-commerce application, a specific product may be added to a cart. However, it may be detected that the user later edit or reversed that action. This can serve as passive feedback that the utterance may not have been correctly interpreted. Additionally, the user's edit may provide information that can help correct the interpretation. For example, if the user replaces the item that was added to the cart with another item, it may be learned that the utterance or string of phonemes corresponds to one or more associated with the item that the user manually added in place of the automatically added item. In some embodiments, this information resides on the application platform (e.g., collection of data stores that host the application), and the feedback service 416 can access the application platform to collect this information.

Whether active or passively collected, the user feedback includes one or more known words that correspond to the string of phonemes. Thus, the string of phonemes is associated with those words, indicating that when a user is saying those words when they produce such a string of phonemes. In some embodiments, the user-specific speech recognition key 418 for that user account is then updated to associate the string of phonemes with these one or more known words. Similarly, the general speech recognition model 414 can also be trained using this association as a piece of training data. In some embodiments, the user-specific speech recognition key 418 is updated faster than the general speech recognition model 414, such as upon receiving the feedback. In some embodiments, the user account associated with the initial request may have various demographic data, such as language, geographic region, age, gender, and the like. The general speech recognition model may be trained using an association of the string of phonemes and the one or more text keywords and the demographic data.

Figure 5:
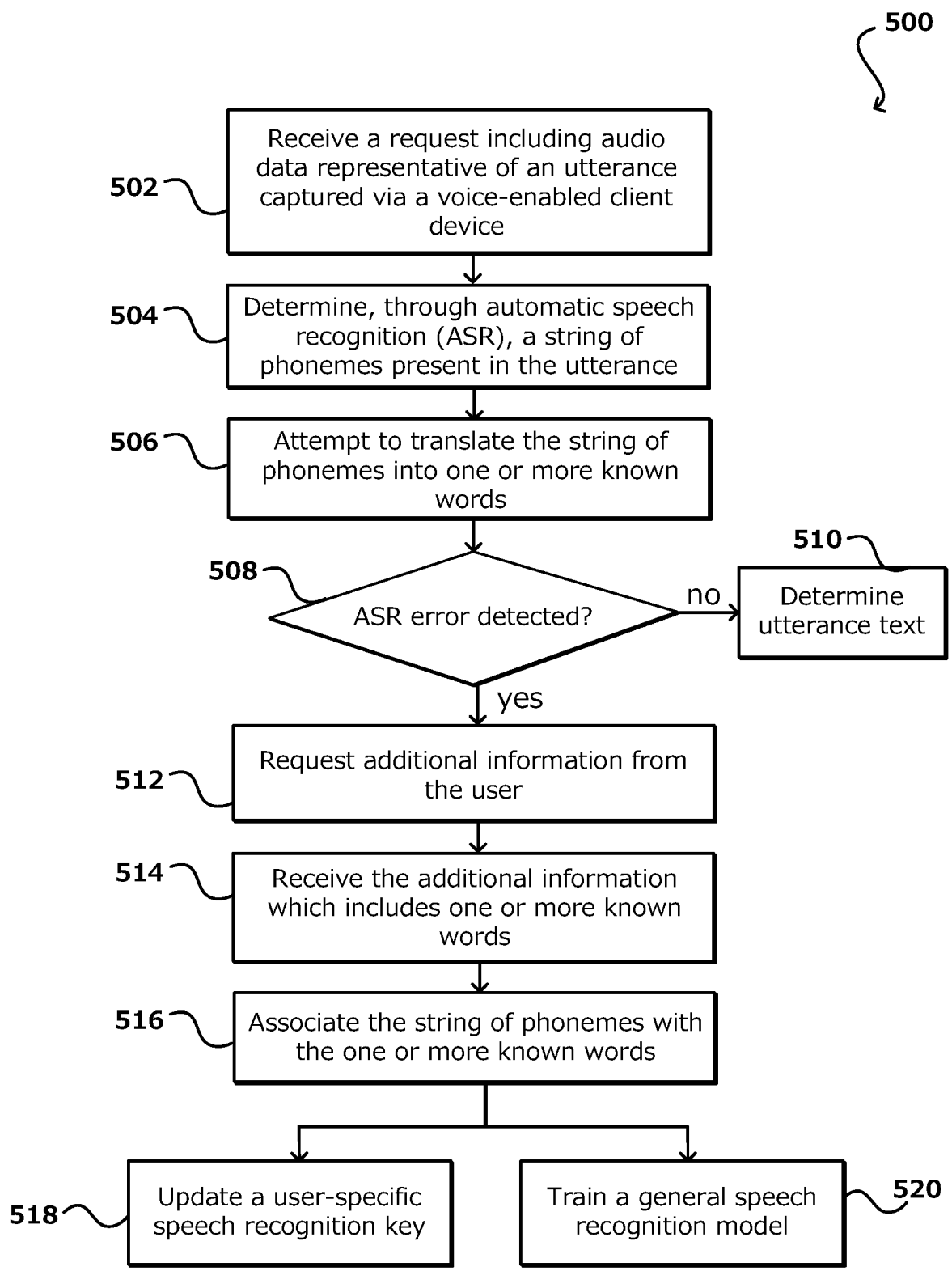
FIG. 5 illustrates an example process of using user feedback to improve speech recognition, in accordance with various embodiments.

FIG. 5 illustrates an example process 500 of using user feedback to improve speech recognition, in accordance with various embodiments. It should be understood that, for any process discussed herein, there can be additional, fewer, or alternative steps performed in similar or alternative orders, or in parallel, within the scope of the various embodiments. In this example, a request including audio data is received 502 from a voice-enabled client device. The audio data is representative of an utterance captured by the device. In some embodiments, the device associated with a user account. For example, the user account may be that of an e-commerce platform that has a database of products available. Automatic speech recognition may be performed on to audio data to determine 504 a string of phonemes present in the utterance. The automatic speech recognition also attempts 506 to translate the string of phonemes into one or more known words. The automatic speech recognition may be associated with a list of possible words. This may include common words of a particular language as well as names and made-up words. In some embodiments, the list of possible words is specific to a certain application. For example, for a shopping application, the list of words may include various name brands and shopping-specific terms.

An error may occur during the automatic speech recognition. For example, errors may include being unable to determine any words that correspond to the string of phonemes or being unable to distinguish between multiple words that seem to correspond to the string of phonemes. In some embodiments, confidence scores may be used as a measure to determine whether a word corresponds to a string of phonemes. It is determined 508 if an error is detected in the automatic speech recognition. In some embodiments, if there is no error detected in the automatic speech recognition process, then utterance text is successfully determined 510. Depending on the application, various things can then be done using the text to fulfill the user's request. If there is an error detected in the automatic speech recognition process, additional information may be requested 512 from the user. This may be done via the voice-enabled client device from which the initial request was received, or via a display-based client device. For example, the voice-enabled device may say "Please say one if you meant coke or say two if you meant coat". The user may then respond directly to the question with their answer through voice, just like a real-time dialogue. In some embodiments, the user may provide their answer directly without a wakeword. Alternatively, a prompt may be generated in the graphic interface of the e-commerce platform displayed on a client device such as a computer or smartphone. For example, the user may be prompted through the graphic interface to select between the options "coat" or "coke".

The additional information is then received 514. Regardless of the means of obtaining the additional information, the additional information includes one or more known words. Thus the one or more keywords are associated with the string of phonemes obtained from the original voice data. Essentially, the speech recognition system now knows that the string of phonemes corresponds to these keywords. A user-specific speech recognition key for the user account is then updated 518 to associate the string of phonemes with these one or more keywords. A general speech recognition model can also be trained 520 using an association of the string of phonemes and the one or more keywords. In some embodiments, the user-specific speech recognition key is referenced for the specific user account, and the general speech recognition model is referenced during speech recognition for a plurality of user accounts. In some embodiments, the user-specific speech recognition key is updated faster than the general speech recognition model, such upon receiving the additional information. In some embodiments, the user account associated with the initial request may have various demographic data, such as language, geographic region, age, gender, and the like. The general speech recognition model may be trained using an association of the string of phonemes and the one or more text keywords and the demographic data. In some embodiments, the general speech recognition model is a part of at least one of an automatic speech recognition (ASR) model, a natural language understanding (NLU) model, or a named entity recognition (NER) model associated with an e-commerce platform.

Figure 6:
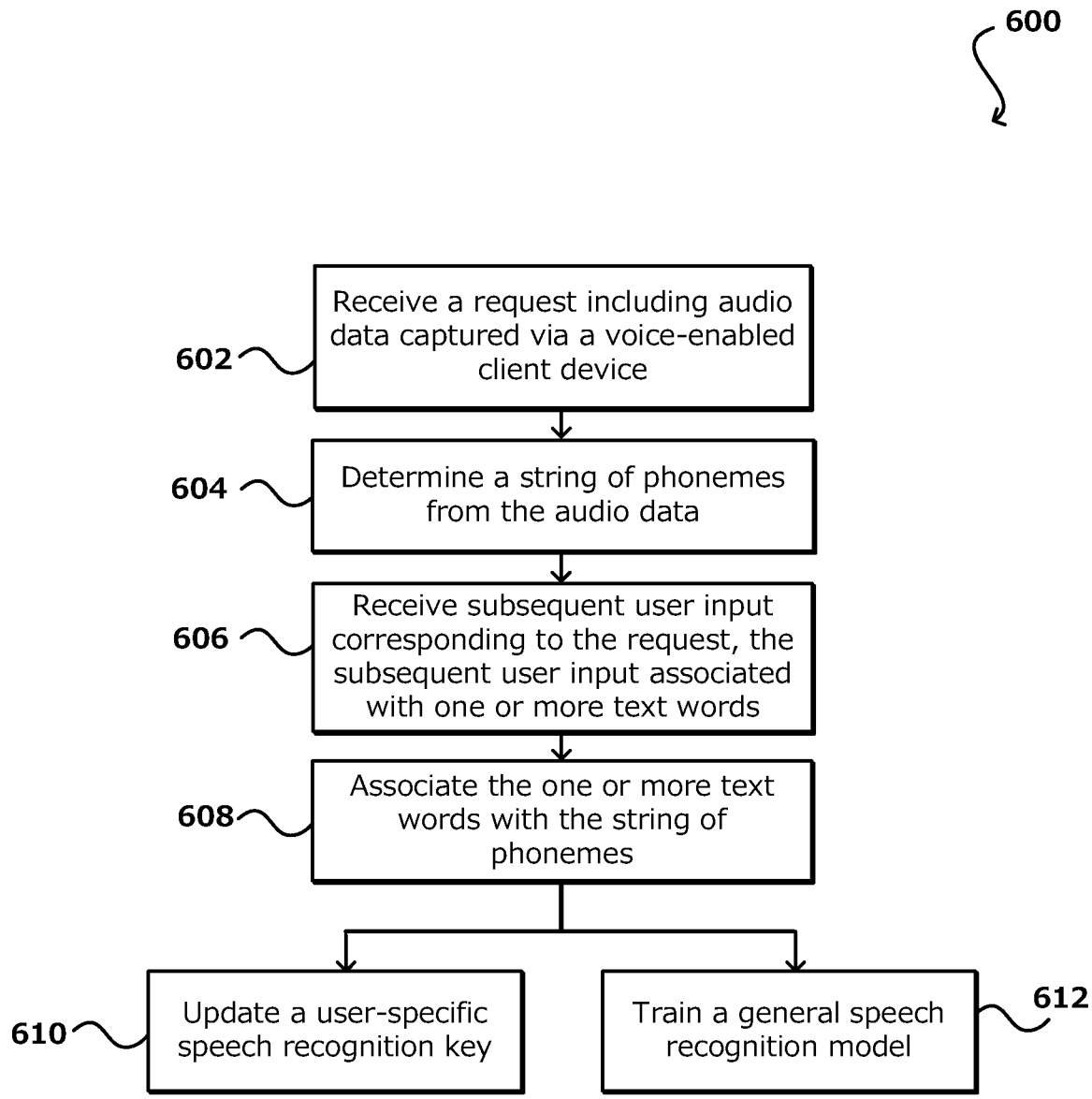
FIG. 6 illustrates another example process of using user feedback to improve speech recognition, in accordance with various embodiments.

FIG. 6 illustrates another example process 600 of using user feedback to improve speech recognition, in accordance with various embodiments. In this example, a request including audio data is received 602 from a voice-enabled client device. The audio data is representative of an utterance captured by the device. In some embodiments, the device associated with a user account. A string of phonemes present in the utterance is determined 604, such as through an automatic speech recognition process. At a later time, a subsequent user input corresponding to the request may be received 606, in which the user input is associated with one or more text keywords.

The subsequent user input may be obtained in response to an active request for feedback from the user to disambiguate between a plurality of possible items or words. In this case, an error may have been detected and thus feedback from the user is actively elicited. In some embodiments, requesting additional information is performed over voice though a voice-enabled client device. In some embodiments, requesting additional information is performed via graphical interface on a display-based client device. Alternatively, feedback may not be actively elicited, but rather collected passively. For example, the speech recognition may think it successfully recognized the utterance and a downstream system performs an action accordingly. However, this action may not be what the user intended because the utterance was actually not correctly recognized. The user may correct this, such as by takin an item out of the cart manually and replacing it with a different item. This may provide the additional information.

However it is obtained, the one or more keywords associated with the subsequent user input may be associated 608 with the string of phonemes to indicate that the user is saying or mean those keywords when they product that string of phonemes. A user-specific speech recognition key for the user account is then updated 610 to associate the string of phonemes with these one or more keywords. The user-specific speech recognition key is a rules-based or deterministic means of speech recognition. A general speech recognition model can also be trained 612 using an association of the string of phonemes and the one or more keywords. In some embodiments, the general speech recognition may be trained many different examples of phoneme strings that are associated with a certain one or more keywords. The general speech recognition model is a statistical model that predicts the most likely words for a given phoneme string based on training data.

In some embodiments, the user-specific speech recognition key is referenced for the specific user account, and the general speech recognition model is referenced during speech recognition for a plurality of user accounts. In some embodiments, the user-specific speech recognition key is updated faster than the general speech recognition model, such upon receiving the additional information. In some embodiments, the user account associated with the initial request may have various demographic data, such as language, geographic region, age, gender, and the like. The general speech recognition model may be trained using an association of the string of phonemes and the one or more text keywords and the demographic data. In some embodiments, the general speech recognition model is a part of at least one of an automatic speech recognition (ASR) model, a natural language understanding (NLU) model, or a named entity recognition (NER) model associated with an e-commerce platform.

In some embodiments, after the user-specific speech recognition key is updated, it can be used to translate the string of phonemes into the correct text keywords. For example, if a second request is received from the same user account and that include the string of phonemes, it can be determined through referencing the user-specific speech recognition key that the user is referring to those words. In some embodiments, after the general speech recognition model is trained using the association between the string of phonemes and the one or more keywords, and a request from a different user includes that string of phonemes, the general speech recognition model may be used to recognize the string of phonemes as referring to those words even for a different user account.

Figure 7:
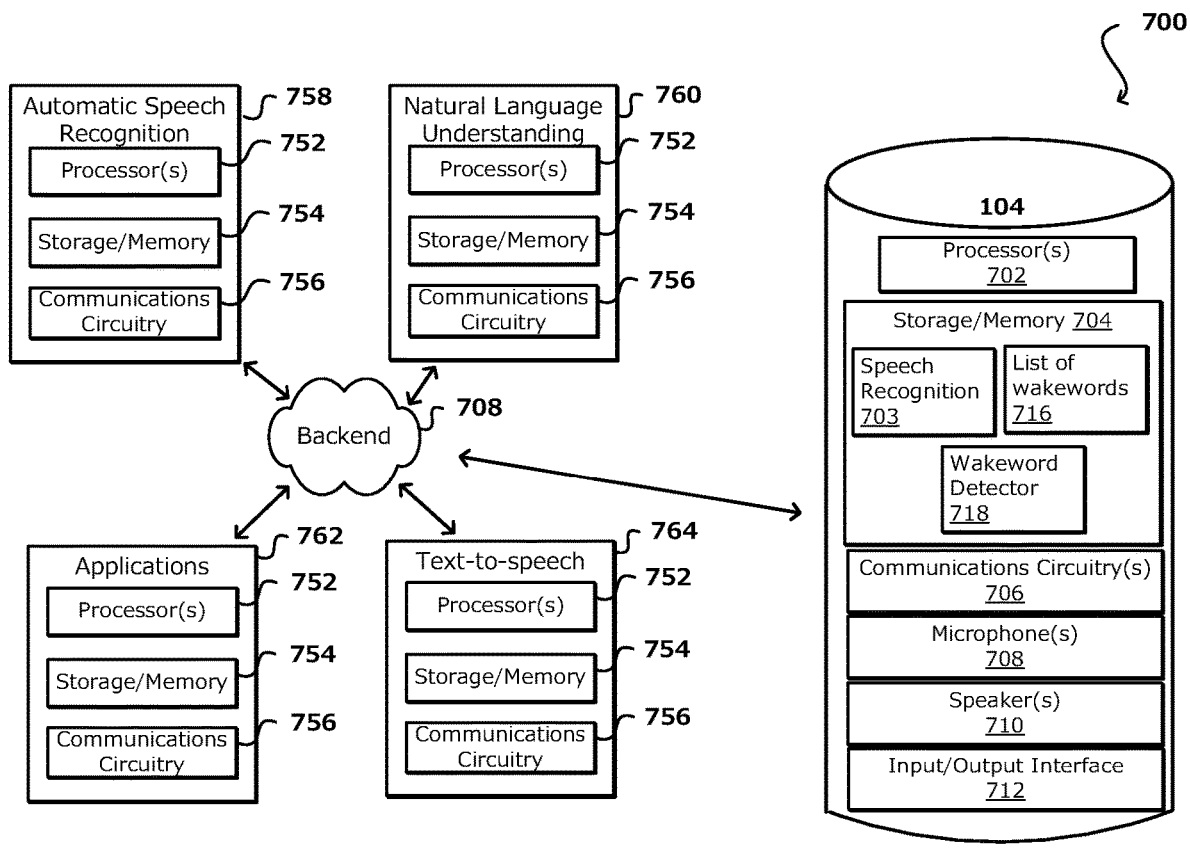
FIG. 7 illustrates an example implementation device, in accordance with various embodiments of the present disclosure.

FIG. 7 is another example environment 700 for implementing aspects in accordance with various embodiments. In this example, voice-enabled communications device 104, in some embodiments, may correspond to any type of electronic device capable of being activated in response to detecting a specific sound. Voice-enabled communications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-enabled devices, smart furniture, smart household devices, smart vehicles, smart transportation devices, and/or smart accessories, among others. In some embodiments, voice-enabled communications device 104 may be relatively simple or basic in structure such that no mechanical input option(s) (e.g., keyboard, mouse, trackpad) or touch input(s) (e.g., touchscreen, buttons) may be provided. For example, voice-enabled communications device 104 may be capable of receiving and outputting audio, and may include power, processing capabilities, storage/memory capabilities, and communication capabilities. Voice-enabled communications device 104 may include a minimal number of input mechanisms, such as a power on/off switch, however primary functionality, in one embodiment, of voice-enabled communications device 104 may solely be through audio input and audio output. For example, voice-enabled communications device 104 may listen for a wakeword by continually monitoring local audio. In response to the wakeword being detected, voice-enabled communications device 104 may establish a connection with backend server, send audio input data to backend server, and await/receive a response from backend server. In some embodiments, however, non-voice-enabled devices may also communicate with backend server (e.g., push-to-talk devices). Voice-enabled communications device 104 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice-enabled communications device 104, and/or one or more components may be omitted. For example, voice-enabled communications device 104 may include a power supply or a bus connector. As another example, voice-enabled communications device 104 may not include a visual I/O interface. Furthermore, while multiple instances of one or more components may be included within voice-enabled communications device 104, for simplicity only one of each component has been shown. Processor(s) 702 may include any suitable processing circuitry capable of controlling operations and functionality of voice-enabled communications device 104, as well as facilitating communications between various components within voice-enabled communications device 104. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice-enabled communications device 104, and/or one or more firmware applications, media applications, and/or applications resident thereon. Storage/memory 704 may include one or more types of storage mediums such as any volatile or non-volatile memory, or any removable or non-removable memory implemented in any suitable manner to store data on voice-enabled communications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704. In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 708 for processing. List of wakewords database 716 may be a database stored locally on voice-enabled communications device 104 that includes a list of a current wakeword for voice-enabled communications device 104, as well as one or more previously used, or alternative, wakewords for voice-enabled communications device. In some embodiments, user 104 may set or program a wakeword for voice-enabled communications device 104. The wakeword may be programmed directly on voice-enabled communications device 104, or a wakeword or words may be set by the individual via a backend server application (app) that is in communication with backend server 708. For example, a user may use their mobile device having the backend server application running thereon to set the wakeword. The specific wakeword may then be communicated from the mobile device to backend server 708, which in turn may send/notify voice-enabled communications device 104 of the individual's selection for the wakeword. The selected activation may then be stored in list of wakewords database 716 of storage/ memory 704. Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken. In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 104 may then begin sending the audio signal to backend server 708 for detecting and responds to subsequent utterances made by a user. Communications circuitry 706 may include any circuitry allowing or enabling voice-enabled communications device 104 to communicate with one or more devices, servers, and/or systems. For example, communications circuitry 706 may facilitate communications between voice-enabled communications device 104 and backend server 708. Communications circuitry 706 may use any communications protocol, such as any of the previously mentioned exemplary communications protocols. In some embodiments, voice-enabled communications device 104 may include an antenna to facilitate wireless communications with a network using various wireless technologies (e.g., Wi-Fi, Bluetooth, radiofrequency, etc.). In yet another embodiment, voice-enabled communications device 104 may include one or more universal serial bus ("USB") ports, one or more Ethernet or broadband ports, and/or any other type of hardwire access port so that communications circuitry 706 allows voice-enabled communications device 104 to communicate with one or more communications networks. Voice-enabled communications device 104 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice-enabled communications device 104 may include multiple microphones (e.g., four, seven, ten, etc.) placed at various positions about voice-enabled communications device 104 to monitor/capture any audio outputted in the environment where voice-enabled communications device 104 is located. The various microphones 708 may include some microphones optimized for distant sounds, while some microphones may be optimized for sounds occurring within a close range of voice-enabled communications device 104. Voice-enabled communications device 104 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice-enabled communications device 104 may be located. In some embodiments, speaker(s) 710 may include headphones or ear buds, which may be wirelessly wired, or hard-wired, to voice-enabled communications device 104, that may be capable of broadcasting audio. In some embodiments, one or more microphones 708 may serve as input devices to receive audio inputs, such as speech. Voice-enabled communications device 104, may then also include one or more speakers 710 to output audible responses. In this manner, voice-enabled communications device 104 may function solely through speech or audio, without the use or need for any input mechanisms or displays. In one exemplary embodiment, voice-enabled communications device 104 includes I/O interface 712. The input portion of I/O interface 712 may correspond to any suitable mechanism for receiving inputs from a user of voice-enabled communications device 104. For example, a camera, keyboard, mouse, joystick, or external controller may be used as an input mechanism for I/O interface 712. The output portion of I/O interface 712 may correspond to any suitable mechanism for generating outputs from voice-enabled communications device 104. For example, one or more displays may be used as an output mechanism for I/O interface 712. As another example, one or more lights, light emitting diodes ("LEDs"), or other visual indicator(s) may be used to output signals via I/O interface 712 of voice-enabled communications device 104. In some embodiments, one or more vibrating mechanisms or other haptic features may be included with I/O interface 712 to provide a haptic response to user 104 from voice-enabled communications device 104. Persons of ordinary skill in the art will recognize that, in some embodiments, one or more features of I/O interface 712 may be included in a purely voice-enabled version of voice communications device 104. For example, one or more LED lights may be included on voice-enabled communications device 104 such that, when microphone(s) 708 receive audio from user 104, the one or more LED lights become illuminated signifying that audio has been received by voice-enabled communications device 104. In some embodiments, I/O interface 712 may include a display screen and/or touch screen, which may be any size and/or shape and may be located at any portion of voice-enabled communications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. FIG. 7 also includes backend server 766, as mentioned previously, which may be in communication with voice-enabled communications device 104. Backend server 766 (e.g., part of a resource provider environment) includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, backend server 766 may also include computer readable media, including, but not limited to, flash memory, random access memory ("RAM"), and/or read-only memory ("ROM"). Backend server 766 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used. ASR module 758 may be configured such that it recognizes human speech in detected audio, such as audio captured by voice-enabled communications device 104, which is then sent to backend server 766. ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 760 may be configured such that it determines user intent based on the detected audio received from voice-enabled communications device 104. NLU module 760 may include processor(s) 752, storage/memory 754, and communications circuitry 756. Applications module 762 may, for example, correspond to various action specific applications or servers capable of processing various task specific actions. Applications module 762 may further correspond to first party applications and/or third party applications operable to perform different tasks or actions. For example, based on the context of audio received from voice-enabled communications device 104, backend server 766 may use a certain application to perform an action, such refining an active play queue of media content. Applications module 762 may include processor(s) 752, storage/memory 754, and communications circuitry 756. As an illustrative example, applications module 762 may correspond to a media service. The electronic media service application of the applications module 762 can be associated with a customer account. The customer account can include at least one profile stored in, for example, user information that can be linked to the electronic media service application in applications module 762. Audio input data can be received at automatic speech recognition module 758 from voice communications device 104. The automatic speech recognition module 758 can use automatic speech recognition (ASR) techniques on the audio input data to generate text data of the audio input data. The natural language understanding module 760 can use natural language understanding (NLU) techniques on the text data to determine refinement/attribute information to manage the active play queue. The electronic media service application of the applications module 762 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music. TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756. Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760, however the actual processor(s) 752 need not be the same entity.

Figure 8:
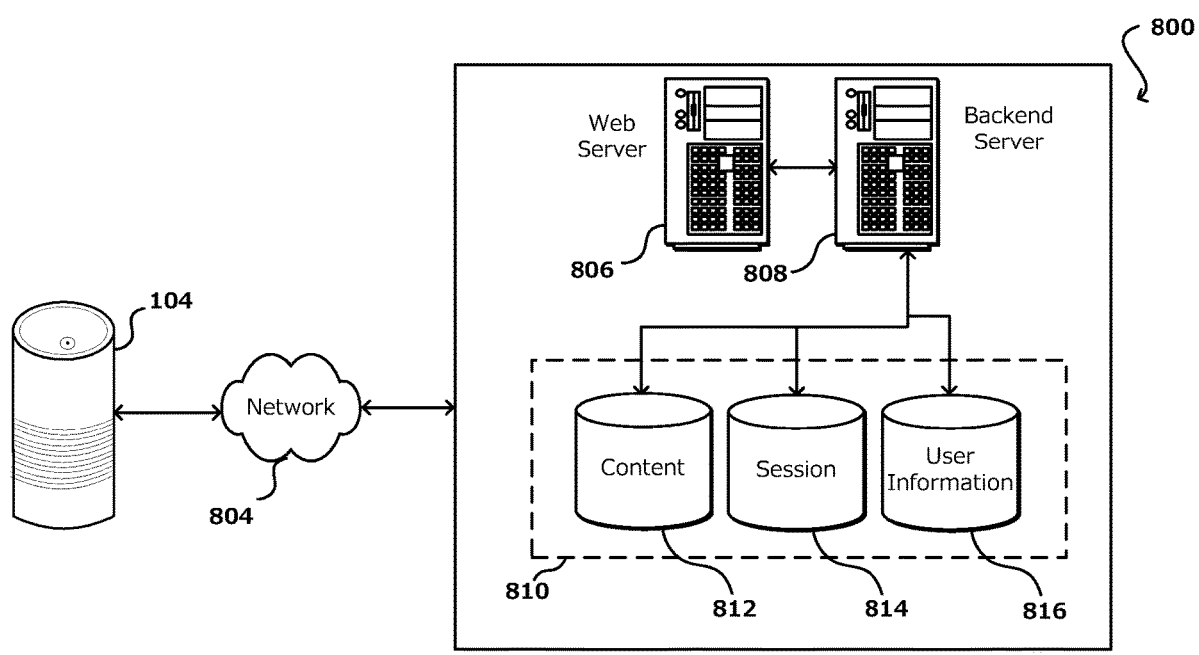
FIG. 8 illustrates an example implementation environment, in accordance with various embodiments of the present disclosure.

In accordance with various embodiments, different approaches can be implemented in various environments in accordance with the described embodiments. For example, FIG. 8 illustrates an example of an environment 800 for implementing aspects in accordance with various embodiments (e.g., a resource provider environment). As will be appreciated, although a Web-based environment is used for purposes of explanation, different environments may be used, as appropriate, to implement various embodiments. The system includes voice communications device 104, which can include any appropriate device operable to send and receive requests, messages or information over network 804 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art. The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the voice communications device 104 and the backend server 808, can be handled by the Web server 806. It should be understood that the Web and application servers are not required and are merely example components, as structured code discussed herein can be executed on any appropriate device or host machine as discussed elsewhere herein. The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one computing device processor; and
a memory device including instructions that, when executed by the at least one computing device processor, cause the system to:
receive a request for one or more offerings from one or more electronic catalogs offered in an e-commerce environment, the request including audio data from a voice-enabled device, the audio data representative of an utterance captured by the device, the device associated with a user account;
determine a string of phonemes present in the utterance;
perform automatic speech recognition (ASR) on the string of phonemes to attempt to interpret the string of phonemes into one or more words, the automatic speech recognition associated with an index of words, the index of words associated with the e-commerce environment;
detect an error in interpreting the string of phonemes, the error including a low-confidence score or ambiguity between multiple interpretations;
in response to detecting the error, request additional information from the user via the voice-enabled device;
receive, in response to the request for additional information, the additional information as a voice input, the additional information associated with one or more known words from the index of words;
update a user-specific speech recognition key for the user account to associate the string of phonemes with the one or more known words;
train a general speech recognition model, associated with the e-commerce environment, using the association of the string of phonemes and the one or more known words, wherein the user-specific speech recognition key is updated faster than the general speech recognition model is trained.

2. The system of claim 1, wherein the instructions when executed further cause the system to:
utilize the additional information to perform subsequent steps associated with the request from the voice-enabled device.

3. The system of claim 1, wherein the additional information is received in the form of second audio data captured by the voice-enabled device.

4. The system of claim 1, wherein the additional information is received in the form of user input entered into a graphical interface displayed on the display-based client device.

5. A computer-implemented method, comprising:
receiving a request for one or more offerings from one or more electronic catalogs offered in an e-commerce environment, the request including audio data from a voice-enabled device, the audio data representative of an utterance captured by the device, the device associated with a user account;
analyzing the audio data using a general speech recognition model and a user-specific speech recognition key associated with the user account;
determining a string of phonemes present in the utterance;
detecting an error in forming words from the string of phonemes;
receiving, in response to detecting the error, a subsequent user utterance corresponding to the request, the user utterance associated with one or more known words, the one or more known words associated with the e-commerce environment;
associating the string of phonemes with the one or more known words;
updating the user-specific speech recognition key with the association of the string of phonemes and the one or more known words; and
providing the string of phonemes and the one or more known words to further train the general speech recognition model, the user-specific speech recognition key being updated faster than the general speech recognition model is trained.

6. The method of claim 5, further comprising:
requesting additional information from the user via a client device.

7. The method of claim 6, wherein requesting additional information is performed over voice though a voice-enabled client device.

8. The method of claim 6, wherein requesting additional information is performed via graphical interface on a display-based client device.

9. The method of claim 5, further comprising:
training a general speech recognition model using the association of the string of phonemes and the one or more known words, wherein the general speech recognition model is a statistical model.

10. The method of claim 9, wherein the general speech recognition model is referenced during speech recognition for a plurality of user accounts, and wherein the user-specific speech recognition key is reference during speech recognition for the specific user account.

11. The method of claim 9, wherein the user-specific speech recognition key is updated faster than the general speech recognition model.

12. The method of claim 9, further comprising:
determining demographic data associated with the user account; and
training the general speech recognition model using an association of the string of phonemes and the one or more known words and the demographic data.

13. The method of claim 9, wherein the general speech recognition model is a part of at least one of an automatic speech recognition (ASR) model, a natural language understanding (NLU) model, or a named entity recognition (NER) model associated with an e-commerce platform.

14. The method of claim 5, further comprising:
receiving a second request including the string of phonemes;
referencing the updated user-specific speech recognition key; and
recognizing the string of phonemes as corresponding to the one or more known words.

15. The method of claim 9, further comprising:
receiving a second request associated with a second user account, the second request including a second utterance;
determining that the second utterance includes the string of phonemes;
referencing the trained general speech recognition model; and
recognizing the string of phonemes as corresponding to the one or more known words.

16. A system, comprising:
at least one computing device processor; and
a memory device including instructions that, when executed by the at least one computing device processor, cause the system to:
receive a request for one or more offerings from one or more electronic catalogs offered in an e-commerce environment, the request including audio data from a voice-enabled device, the audio data representative of an utterance captured by the device, the device associated with a user account;
analyze the audio data using a general speech recognition model and a user-specific speech recognition key associated with the user account;
determine a string of phonemes present in the utterance;
detecting an error in forming words from the string of phonemes;
receive, in response to detecting the error, a subsequent user utterance corresponding to the request, the user utterance associated with one or more known words, the one or more known words associated with the e-commerce environment;
associate the string of phonemes with the one or more known words;
update the user-specific speech recognition key with the association of the string of phonemes and the one or more known words; and
provide the string of phonemes and the one or more known words to further train the general speech recognition model, the user-specific speech recognition key being updated faster than the general speech recognition model is trained.

17. The system of claim 16, wherein the instructions that, when executed by the at least one computing device processor, further cause the system to:
training a general speech recognition model using the association of the string of phonemes and the one or more known words, wherein the general speech recognition model is a statistical model.

18. The system of claim 17, wherein the general speech recognition model is referenced during speech recognition for a plurality of user accounts, and wherein the user-specific speech recognition key is reference during speech recognition for the specific user account.

19. The system of claim 17, wherein the user-specific speech recognition key is updated faster than the general speech recognition model.

20. The system of claim 17, wherein the general speech recognition model is a part of at least one of an automatic speech recognition (ASR) model, a natural language understanding (NLU) model, or a named entity recognition (NER) model associated with an e-commerce platform.

* * * * *